United States Patent [19]

Wolf et al.

[11] 4,354,014

[45] Oct. 12, 1982

[54] POWDERED COATING COMPOSITIONS HAVING GOOD STORAGE STABILITY AND PRODUCTION OF SAME

[75] Inventors: Elmar Wolf; Rainer Gras, both of Herne, Fed. Rep. of Germany

[73] Assignee: Chemische Werke Huls Aktiengesellschaft, Marl, Fed. Rep. of Germany

[21] Appl. No.: 165,205

[22] Filed: Jul. 1, 1980

[30] Foreign Application Priority Data

Jul. 19, 1979 [DE] Fed. Rep. of Germany ....... 2929150

[51] Int. Cl.³ .............................................. C08G 18/80
[52] U.S. Cl. ..................................................... 528/45
[58] Field of Search ......................................... 528/45

[56] References Cited

U.S. PATENT DOCUMENTS

| | | | |
|---|---|---|---|
| 3,822,240 | 7/1974 | Schmitt et al. | 528/45 |
| 3,947,426 | 3/1976 | Landen | 528/45 |
| 4,246,380 | 1/1981 | Gras et al. | 525/440 |

Primary Examiner—Maurice J. Welsh
Attorney, Agent, or Firm—Oblon, Fisher, Spivak, McClelland & Maier

[57] ABSTRACT

Powdered coating compositions having good storage stability and particle size smaller than 0.25 mm, particularly 0.02 and 0.06 mm, based on polyesters which contain hydroxyl groups and melt between 40°–120° C., ε-caprolactam blocked isophorondiisocyanate adducts, and catalysts, if necessary, and customary additives, wherein isophoronediisocyanate adducts partially blocked with ε-caprolactam are used as curing agents.

Methods for producing the above mentioned powdered coating compositions, wherein the polyesters containing hydroxyl groups are reacted in the melt or in solvents at temperatures of 0°–150° C., particularly 80°–120° C., with an isophorondiisocyanate adduct blocked with ε-caprolactam which contains 0.1 to 1 mole of free NCO-groups per mole of adduct and 0.4–1.1 NCO-equivalents separate to OH equivalent.

6 Claims, No Drawings

POWDERED COATING COMPOSITIONS HAVING GOOD STORAGE STABILITY AND PRODUCTION OF SAME

BACKGROUND OF THE INVENTION

The present invention relates to methods for producing powdered coating masses by converting polyesters containing hydroxyl groups with isophorondiisocyanate adducts partially blocked with ε-caprolactam. The invention also relates to the products produced by said methods which are used as coating materials.

It is known, e.g. from German Pat. No. 55 820, to apply powdered mixtures of high melting polyesters containing hydroxyl groups and polyisocyanates whose isocyanate groups are capped by phenol, by electrostatic spraying onto substrates and then to heat them to form hardened coatings. The disadvantages of this method include evolution of strongly malodorous phenol, frequent insufficient reactivity in the presence of catalysts, and process disturbances, such as bubble formation, for example. According to the teaching of German Offenlegungsschrift No. 19 57 483 these disadvantages are avoided by using ε-caprolactam capped polyisocyanates instead of the phenol-capped compounds mentioned above.

German Offenlegungsschrift No. 21 15 777 also describes powdered coating materials based on polyesters containing hydroxyl groups and ε-caprolactam blocked polyisocyanates which are characterized by the fact that they contain, as ε-caprolactam blocked polyisocyanates, such polyisocyanates as those based on 3-isocyanatomethyl-3,5,5-trimethylcyclohexylisocyanate (subsequently designated IPDI or isophoronediisocyanate) or the products of its reaction with polyols, wherein the polyisocyanates and the polyol are used in such proportion that the resulting product has at least two NCO-groups.

The mixture of polyesters containing hydroxyl groups and polyisocyanates blocked with ε-caprolactam described in the documents mentioned above are cured at 180°–200° C. within about 30 minutes. There is great interest in ε-caprolactam blocked polyisocyanates in the production of powder hardeners for polyisocyanates which definitely unblock below 200° C. The unblocking temperature can be lowered by the use of catalysts such as tertiary amines; however the result is cured films which are more susceptible to hydrolysis and less resistant to oxidation.

The surprising and welcome discovery has now been made that the hardening temperature mentioned in the German Offlegungsschrift can be lowered about 20°–30° C. by using in place of the blocked isophoronediisocyanate adducts or isophoronediisocyanate/glycol adducts, isophoronediisocyanate adducts which are only partially blocked with ε-caprolactam and which contain per mole more than 0.1 but no more than 1.0 moles of free NCO-groups.

These isophoronediisocyanate adducts, partially blocked with ε-caprolactam, which are described in futher detail hereinbelow, are compounds which are obtained by partial ε-caprolactam blocking of isophoronediisocyanate adducts which contain urethane, biuret, isocyanurate, or carbodiimide groups and have an NCO-content of 17–35%. These isophoronediisocyanate adducts which are only partially blocked with ε-caprolactam are solid and melt at 65°–150° C.

SUMMARY OF THE INVENTION

The invention has as its object powdered coating materials having good storage stability and particle size less than 0.25 mm, particularly 0.02 and 0.06 mm, based on polyesters containing hydroxyl groups and melting at between 40°–120° C., combined with ε-caprolactam blocked isophoronediisocyanate adducts and, if necessary, catalysts and customary additives, characterized by the fact that isophoronediisocyanate adducts only partially blocked with ε-caprolactam are used.

A further object of the invention is a method for producing the above mentioned powdered coating materials, characterized by the fact that the polyesters containing hydroxyl groups are reacted in the melt or in solvents at temperatures of 0°–150° C., particularly 80°–120° C., with an isophoronediisocyanate adduct blocked by ε-caprolactam which contains per mole of adduct 0.1 to 1 mole, particularly 0.1.–0.4 mole, of free NCO-groups, and that 0.4–1.1 NCO-equivalents are present per 1 OH equivalent.

According to the invention the isophoronediisocyanate adduct can comprise IPDI and low molecular weight polyols which are further explained hereinbelow.

The isophoronediisocyanate adduct can also comprise trimerized IPDI alone or in a mixture with monomeric IPDI and have an NCO-content of 17–35% by weight.

The isophoronediisocyanate adduct can also comprise IPDI containing urea groups and have an NCO-content of 22–35% by weight.

The isophoronediisocyanate adduct can comprise IPDI containing biuret groups and have an NCO-content of 20–35% by weight.

The isophoronediisocyanate adduct can comprise IPDI containing carbodiimide groups and have an NCO-content of 22–35% by weight.

The isophoronediisocyanate adduct can comprise the isophoronediisocyanate adduct containing urea and urethane groups which is derived from IPDI and 1-hydroxy-3-aminoethyl-3,5,5-trimethylcyclohexane.

Polyesters containing hydroxyl groups and isophoronediisocyanate adducts partially blocked with ε-caprolactam are contained in the powdered coating materials in such amounts that 0.9–1.1 NCO-group equivalents are present per 1 hydroxy group equivalent. The isophoronediisocyanate adducts, partially blocked with ε-caprolactam according to the invention, are compatible with most polyesters and produce homogeneous melts at elevated temperatures (80°–120° C.). These melts are suitable for the production of sintered powders. The good storage stablility of the coating materials according to the invention is remarkable in comparison to the mixtures used in German Offenlegungsschrift No. 21 05 777. This improved storage stability of the mixture according to the invention is most likely attributable to the reaction of the free NCO-groups in the hardener with the OH-groups of the resin, present in excess, which occurs in the mixing process (extrusion at 80°–120° C.). The OH/NCO (free)-reaction which takes place at 80°–120° C. is complete in the presence of catalysts, such as teritary amines, organotin compounds such as dibutyltin dilaurate or acetylacetonates, such as tin acetylacetonate. Cross-linking cannot occur in the mixture according to the invention at 80°–120° C., a temperature at which no unblocking of the ε-caprolactam blocked NCO-groups yet occurs, because the OH-groups are present greatly in excess of the NCO-groups.

The hardening times in the temperature range of 150°–200° C. are between 30–8 minutes. Surprisingly only a few % by weight of the ε-caprolactam blocking agent are released into the atmosphere in the reaction.

The hardened coatings or layers are characterized by good chemical and mechanical characteristics as well as chemical resistance.

DESCRIPTION OF THE PREFERRED EMBODIMENTS

The hydroxy group-containing polyesters used according to the invention are solid below 40° C. and melt between 40° and 120° C. They can be composed of aliphatic, cycloaliphatic and/or aromatic polycarboxylic acids.

The following are examples of aliphatic, cycloaliphatic and aromatic polycarboxylic acids, in which the aromatic moiety can be mono or polynucleic, e.g. oxalic acid, succinic acid, glutaric acid, 2,2-dimethylglutaric acid, adipic acid, 2,2,4- or 2,4,4-trimethyladipic acid, sebacic acid, dodecane dicarboxylic acid, terephthalic acid, methylterephthalic acid, 2,5- and 2,6-dimethylterephthalic acid, chloroterephthalic acid, 2,5-dichloroterephthlic acid, fluoroterephthalic acid, isophthalic acid, trimellitic acid, naphthalenedicarboxylic acid, particularly the 1,4-,1,5- ,2,6- and 2,7-isomers, phenylene-1,4-diacetic acid, 4-carboxyphenoxyacetic acid, m- and p-terphenyl-4,4''-dicarboxylic acid, dodecahydrodiphenic acid, hexahydroterephthalic acid, 4,4'-diphenic acid, 2,2'- and 3,3'-dimethyl-4,4'-diphenic acid, 2,2'-dibromo-4,4'-diphenic acid, bis(4-carboxyphenyl)-methane, 1,1- and 1,2-bis(4-carboxyphenyl)propane, 1,2-bis(4-carboxyphenoxy)ethane, bis-4-carboxyphenyl ether, bis-4-carboxyphenylsulfide, bis-4-carboxyphenylketone, bis-4-carboxyphenylsulfoxide, bis-4-carboxyphenlsulfone, 2,8-dibenzofurandicarboxylic acid, 4,4'-stilbendicarboxylic acid and octadecahydro-m-terphenyl-4,4'-dicarboxylic acid among others. Of course, in place of the named acids, their functional derivatives, such as anhydrides and esters, among others, can also be used. Mixtures of the above-named compounds can be also be used.

Diols are the preferred alcohol components for the production of polyesters containing hydroxyl groups. It is also possible to make partial use of other polyols, e.g. triols; examples of suitable compounds are: ethylene glycol, propylene glycols, such as 1,2- and 1,3-propane diol, 2,2-dimethylpropanediol-(1,3), butanediols, such as butanediol-(1,3), or (1,4), hexanediols, e.g. hexanediol-(1,6), 2,2,4-trimethylhexanediol-(1,6), 2,4,4-trimethylhexanediol-(1,6), heptanediol-(1,7), thiodiglycol, octadecanediol-(1,18), 2,4-dimethyl-2-propylheptanediol-(1,3), butene or butynediol-(1,4), diethylene glycol, triethylene glycol, cis- and trans-1,4-cyclohexanedimethanol, 1,4-cycloheanediol, 2,2-bis(4-hydroxycyclohexyl)propane, bishydroxyethylated 2,2-bis(4-hydroxyphenyl)propane, glycerin, hexanetriol-(1,2,6), 1,1,1-trimethylol propane, 1,1,1-trimethylolethane, and pentaerythritol, among others. Mixtures of the above mentioned compounds can also be used.

In the production of the polyester, the polyol is used in such proportion that more than 1 OH-group equivalent is available per carboxyl group equivalent, so that polyesters with hydroxyl numbers between 40 and 240, preferably between 40 and 150, are obtained.

The polyesters containing hydroxyl groups can be produced by known and customary methods. The following two processes are especially suitable.

In the first process, the starting material is terephthalic acid free from mineral acid, which is purified by recrystallization if necessary. The ratio of the equivalents of acids to those of alcohol is naturally selected in accordance with the desired molecular weight and the OH number to be achieved. The reaction ingredients are heated in suitable apparatus with continuous purging with inert gast, e.g. nitrogen, after addition of 0.005–0.5% by weight, preferably 0.05–0.2% by weight, of a catalyst, e.g. tin compounds such as di-n-butyltin oxide, di-n-butyltin diesters among others, or titanium esters, particularly tetraisopropyl titanate. Liberation of water begins at about 180° C. The water is distilled out of the reaction mixture. Within several hours the reaction temperature rises to 240° C. The reaction medium remains inhomogeneous until shortly before the completion of the esterification. The reaction is complete after about 24 hours.

In the second process, the starting material is dimethyl terephthalate which is transesterified using the desired alcohol moiety under continuous purging with an inert gas, e.g., nitrogen. The possible transesterification catalysts are again titanium esters, dialkyltin esters, or di-n-butyltin oxide used in concentrations of 0.005–0.5 weight percent. Liberation of methanol first appears at about 120° C. Within several hours the temperature rises to 220°–230° C. Depending on the particular charge selected, the transesterification is completed in 2–24 hours. The softening points of the polyester must lie in the defined range, so that it can be processed at temperatures between 70° and 120° C. with the additives necessary to produce the coating material according to the invention. On the other hand the softening point must be high enough that the coating material obtained according to the invention from the polyesters can be ground into non-clumping, free flowing powders with a particle size of 20 or 120μ.

Starting materials which are suitable for the production of the isophoronediisocyanate adduct are, for example, reaction products of low molecular weight diols or polyols (ethylene glycol, 1,4-butanediol, 1,6-hexanediol, neopentyl glycol, diethylene glycol, triethylene glycol, dipropylene glycol, diethanolmethylamine, triethanolamine, trimethylolpropane, or -ethane, pentaerythritol) with IPDI (NCO/OH=2:1) or polyisocyanates having isocyanurate groups which are obtainable in known manner by trimerization of IPDI (British Pat. No. 1,391,066, German Offenlegungsschrift No. 23 25 826).

The catalyst system of triethylenediamine (Dabco ®/propylene oxide described in German Offenlegungsschrift No. 26 44 684 is especially suited for the trimerization of IPDI. The trimerization can take place without solvent or in inert organic solvents. It is essential in carrying out the trimerization process to terminate the reaction at a certain NCO-content in the mixture, preferably when 30–50% of the NCO-groups have reacted through trimerization. The unreacted IPDI is separated from the isocyanurate by thin layer distillation.

Pure IPDI has an NCO-content of 37.8%. The theoretical NCO-value of trimerized IPDI is 18.9%; in practice it is 16–18%.

The isocyanurate-triisocyanates thus available can be used as exclusive isocyanate components or also in a mixture with isocyanurate-free IPDI. Addition of isocyanurate-free IPDI. Addition is isocyanurate-free IPDI makes it possible, in a simple manner, to vary, as desired, the properties of the products of the process, particularly their melting point, their glass transition temperature and their viscosity.

It is particularly advantageous to use the triisocyanate mixture produced in situ as mentioned above, which is obtainable by partial trimerization.

Additional starting materials for the production of the isophoronediisocyanate adducts comprise IPDI containing urea, biuret and/or carbodiimide groups.

The preparation of IPDI adducts containing urea groups is accomplished according to the teaching of German Offenlegungsschrift No. 23 41 065 by reaction of IPDI and $H_2O$ at 80° C. The reaction is finished when 1 mole of $CO_2$ has been evolved per mole of $H_2O$. The urea content in a reaction mixture of IPDI and $H_2O$ can be adjusted as desired through the ratio of IPDI to $H_2O$. The production of IPDI adducts containing biuret groups (German Offenlegungsschrift 23 08 015) takes place in a manner similar to the production to IPDI containing urea groups. Here, too, the reaction of IPDI with $H_2O$, if necessary, in the presence of 0.1-2% of catalysts such as tertiary amines, takes place in two steps. In the first step the two components are heated at 80° C. until 1 mole of $CO_2$ has been evolved per mole of $H_2O$. In the second step the reaction mixture is heated at 160° C. long enough for the NCO-content of the reaction mixture to fall to about 3 NCO-equivalents per mole of $H_2O$.

IPDI adducts containing carbodiimide groups are prepared by catalytic reaction of IPDI with phospholene oxide according to the teaching of U.S. Pat. No. 2,941,966 at 150°-190° C. The amount of $CO_2$ evolved is a measure of the concentration of the carbodiimide groups in the reaction mixture.

In the blocking reaction, generally, the isocyanurate components are introduced and ε-caprolactam is added. The reaction can be carried out in the absence or also the presence of suitable (inert) solvents. The blocking reaction is generally carried out at 80°-140° C. Catalysts, such as tin(II) octoate and/or tertiary amines which accelerate the isocyanurate polyaddition reactions, can also be included. The catalysts are usually added in an amount of 0.001-1% by weight based on the quantity of compounds having hydrogen atoms reactive with isocyanurates.

The preferred polyisocyanates containing isocyanate groups are additionally characterized by a content of isocyanurate groups (calculated as $(CO—N)_3$), urea groups (calculated as

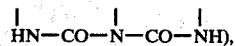

biuret groups (calculated as

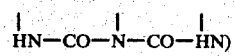

or carbodiimide groups (calculated as

of 2% by weight to 14% by weight, preferably 3–8% by weight.

The content of terminal blocked NCO—groups (calculated as NCO) in the isophoronediisocyanate adducts is 3–20%, preferably 8–18% by weight, that of the free NCO-groups is 1–8% by weight, preferably 2–5% by weight.

Blocking can also be carried out in solvents, as already pointed out. Solvents suitable for this purpose are those which do not react with the polyisocyanates, for example ketones, such as acetone, methyl ethyl ketone, methylisobutyl ketone, cyclopentanone, and cyclohexanone, among others; aromatics such as benzene, toluene, xylenes, chlorobenzene, and nitrobenzene, among others; cyclic ethers such as tetrahydrofuran, and dioxane among others; esters such as methyl acetate, n-butyl acetate, among others, aliphatic chlorinated hydrocarbons such as chloroform, and carbon tetrachloride among others, as well as aprotic solvents such as dimethylformamide, dimethylacetamide, dimethylsulfoxide, etc.

To improve the spreadability of paints, so-called leveling agents are added to the mixture. These can be chemical compounds or mixtures of very widely differing chemical types, e.g. polymers or monomers, acetals, such as polyvinylformal, polyvinylacetal,
polyvinylbutyral,
polyvinylacetobutyral or
di-2-ethylhexyl-i-butdyraldehyde acetal,
di-2-ethylhexyl-n-butyraldehyde acetal,
diethyl-2-ethylhexanol acetal,
di-n-butyl-2-ethylhexanol acetal,
di-i-butyl-2-ethylhexanol acetal,
di-2-ethylhexylacetaldehyde acetal among others,
ethers, such as the polymeric polyethylene glycols and polypropylene glycols, mixed polymers of n-butyl acrylate and vinyl isobutyl ether, ketone-aldehyde condensation resins, solid silicone resins or also mixtures of zinc soaps, or fatty acids aromatic carboxylic acids and the like. Such leveling agents can be contained in additives in amounts of 0.2–5.0% by weight, based on the total amount of the powdered resin.

Reaction of the polyesters containing the hydroxyl groups with the polyisocyanates liberated by unblocking can be accelerated by catalysts. Suitable catalysts are, for example, organotin compounds such as di-n-butyltin dilaurate, and tertiary amines.

The other components of the thermosetting powdered coating mixture such as pigments, dyes, fillers, thixotropic materials UV- and oxidation stabilizers among others can, based on the amount of solid polyester, be varied within a broad range.

The powdered coating material is produced as follows: the solid polyesters containing hydroxyl groups and the blocked polyisocyanates, after the addition of the coating additives mentioned above, if need be, are mixed in the proportions mentioned above and are extruded at a high temperature, i.e. a temperature at which the polyester and blocked polyisocyanates will melt but at least 30° C. below the unblocking temperature of the hardener, cooled and then ground to a particle size less than 0.25 mm, preferably <100μ; if necessary the larger particles can be screened out.

Application of the powdered coating composition to the substrate to be coated can be done according to known methods, e.g. electrostatic spraying, flame spraying, electrostatic flame spraying, etc.

After the coating material has been applied to the object to be coated according to one of the methods described, they are heated for purposes of curing to temperatures above the unblocking temperature of the curing agent, i.e. 150°–200° C., preferably 160°–180° C. Thereupon the resulting coating has the advantages described above.

All substrates are suitable for coating with the powdered coating medium according to the invention as long as they can withstand the curing temperatures without compromising their mechanical characteristics, such as metal and glass surfaces, among others.

Having now described this invention, the same will be further understood by reference to certain specific examples which are included herein for purposes of illustration only and are not intended to be limiting of the invention or any embodiments thereof.

The powdered coating materials according to the invention are illustrated in the following examples:

EXAMPLES

A. PREPARATION OF PARTIALLY BLOCKED ISOPHORONEDIISOCYANATE ADDUCTS

A1A PREPARATION OF THE IPDI ADDUCT FROM IPDI AND DIETHYLENE GLYCOL

At 80° C. 106 parts by weight (p.b.w.) of diethylene glycol were added dropwise to into 444 p.b.w. of IPDI with vigorous stirring. After the diethylene glycol had been completely added, the mixture was heated 2 more hours at 100° C. to complete the reaction. The NCO-content of the reaction product was 15.1%.

A1B ε-CAPROLACTAM BLOCKING OF THE IPDI ADDUCT

At 100° C. 147 p.b.w. of ε-caprolactam were added to 550 p.b.w. of the IPDI adduct produced in A1a in such a manner that the reaction temperature did not exceed 110° C. The reaction mixture was held 2 more hours at 120° C. to complete the reaction

| Free NCO-content | 4.2% |
| --- | --- |
| Blocked NCO-content | 7.8% |
| Melting range | 68–72° C. |
| Glass Transition Temperature (DTA) | 30–41° C. |

A2A PREPARATION OF THE IPDI/ISOCYANURATE MIXTURE 1000 p.b.w. of IPDI were heated with 0.6 p.b.w. of the catalyst system of 2 p.b.w. propylene oxide+1 p.b.w. Dabco ® described in German Offenlegungsschrift No. 26 44 684 for 1.5 hours at 140° C. During this time the NCO-content in the reaction mixture fell to 27.5%. After cooling to room temperature the NCO-content of the reaction mixture was 26%. Vacuum was applied as the reaction mixture cooled.

A2B BLOCKING THE IPDI/ISOCYANURATE MIXTURE

At 100° C., 77.6 p.b.w. of ε-caprolactam were added in portions of 161.5 p.b.w. of the isocyanate containing isocyanurate groups produced in 8a in such a manner that the reaction mixture did not exceed 120° C. The reaction mixture temperature was heated for 2 more hours at 120° C. to complete the reaction.

| Free NCO-content | 5.49% |
| --- | --- |
| Blocked NCO-content | 12.06% |
| Melting range | 72–80° C. |
| Glass Transition Temperature (DTA) | 40–53° C. |

A3A PREPARATION OF THE IPDI/ISOCYANURATE MIXTURE 100 p.b.w. of IPDI were heated with 0.6 p.b.w. of the catalyst system described in A2a in 140° C. for 2 hours. During this period the NCO-content of the reaction mixture decreased to 26.3% NCO. The temperature was then decreased to room temperature under vacuum (10 torr). The NCO-content was 24%.

A3B BLOCKING THE IPDI/ISOCYANURATE MIXTURE

At 110° C., 78.6 p.b.w. of ε-caprolactam were added in portions of 179 p.b.w. of the isophoronediisocyanate produced in A2a. After the addition of ε-caprolactam was complete the reaction mixture was heated for 2 more hours at 125° C. to complete the reaction.

| Free NCO-content | 5.03% |
| --- | --- |
| Blocked NCO-content | 11.52% |
| Melting range | 89–95° C. |
| Glass Transition Temperature (DTA) | 64–73° C. |

A4A PREPARATION OF THE IPDI ADDUCT

At 100° C., 171 p.b.w. of 1-hydroxy-3-aminomethyl-3,5,5-trimethylcyclohexane were added in portions to 1332 p.b.w. of IPDI and were heated until the NCO-content of the reaction mixture was 27.8%.

A4B BLOCKING THE IPDI ADDUCT

At 100° C. 1017 p.b.w. of ε-caprolactam were added in one hour to 1503 p.b.w. of the isocyanate adduct produced in A4a and heated two more hours at 120° C. to complete the reaction.

| Free NCO-content | 1.6% |
| --- | --- |
| Blocked NCO-content | 15% |
| Melting range | 69–73° C. |
| Second Order Transition Temperature (DTA) | 40–48° C. |

A5A PREPARATION OF THE IPDI ADDUCT 766. p.b.w. of IPDI were heated with 18 p.b.w. of H₂O at 80° C. until the NCO-content of the reaction mixture had decreased to 27.8% NCO.

A5B BLOCKING THE IPDI ADDUCT 151 p.b.w. of the IPDI containing urea groups produced in A5a were reacted in portions with 84.75 p.b.w. of ε-caprolactam at 120° C. The reaction mixture was heated further at 120° C. until its NCO-content had fallen to 4.5%.

| Free NCO-content | 4.45% |
| --- | --- |
| Blocked NCO-content | 13.36% |
| Melting range | 82–94° C. |

-continued

| | |
|---|---|
| Glass Transition Temperature (DTA) | 51–65° C. |

B. PREPARATION OF POLYESTERS

B1 9 Moles (1746 g) of dimethylterephthalate, 4 moles (416 g) of 2,2-dimethylpropanediol-1,3, 3.75 moles (540 g) of 1,4-dimethylcyclohexane and 2.5 moles (335 g) of trimethylolpropane were mixed in a 5 l glass flask and warmed using an oil bath. After most of the materials had melted, 0.05% by weight of di-n-butyltin oxide was added at 160° C. as an esterification catalyst. The first methanol evolution occurred at a pot temperature of ca. 170° C. The transesterification was completed after ca. 14 hours. Transesterification took place at a maximum temperature in the final phase of 220° C. The polyester was cooled to 210° C. and most of the volatile components were removed by vacuum stripping at ca. 1 mm Hg. The product in the reactor was stirred during the entire period of condensation. A nitrogen stream of ca. 30 l/hour provided for improved methanol removal.

| Physical Data: | |
|---|---|
| Hydroxyl number | :100–105 mg KOH/g |
| Acid number | :<2 mg KOH/g |
| Melting range | :85–90° C. |
| Glass Transition Temperature (DTA) | :42–54° C. |
| Viscosity at 160° C. | :ca.20000 mm$^2$/sec. |

B2 9 Moles (1494 g) of terephthalic acid, 9 moles (1746 g) of dimethylterephthalate, 3 moles (354 g) of hexanediol-1,6, 3 moles (432 g) of dimethylolcyclohexane, 13 moles (1352 g) of neopentyl glycol and 1 mole (134 g) of trimethylolpropane were transesterified/esterified as described in example B1.

| Physical Data: | |
|---|---|
| Hydroxyl number | :42–52 mg KOH/g |
| Acid number | :4–6 mg KOH/g |
| Melting range | :75–79° C. |
| Glass Transition Temperature (DTA) | :48–58° C. |
| Viscosity at 160° C. | :12000 mm$^2$/sec. |

C. EXAMPLES OF POLYURETHANE POWDER ENAMELS ACCORDING TO THE INVENTION

EXAMPLE 1

C1A CLEAR ENAMEL 100 p.b.w. of the pulverized polyester according to B1 were homogenized together with 62.4 p.b.w. of blocked isocyanate adduct according to A1b and 0.74 p.b.w. of acrylate leveler in a melt at temperatures of 120°–140° C. using a powerful stirrer. After cooling the homogeneous melt was broken up and then ground with a mill to a particle size of <100. The clear enamel powder produced in this manner was applied with an electrostatic powder sprayer to a degreased steel plate at 60 kV and cured in a forced air drying oven at temperatures between 170° and 200° C.

| Curing Conditions | Mechanical Properties | | | | | |
|---|---|---|---|---|---|---|
| Time/Temp | SD | HK | HB | ET | GS | Imp. rev. |
| 12'/200° C. | 40–60 | 190 | 125 | >10 | 0 | >82 |
| 15'/190° C. | 35–50 | 195 | 111 | >10 | 0 | >82 |
| 18'/180° C. | 40–50 | 198 | 111 | >10 | 0 | >82 |
| 25'/170° C. | 35–60 | 190 | 125 | >10 | 0 | >82 |

The abbreviations in this and the following tables mean:
SD = Layer thickness in
HK = Konig Hardness number in sec. (DIN 53157)
HB = Buchholz Hardness number (DIN 53153)
ET = Erichsen Depth number in mm (DIN 53156)
GS = Grid Cut Test (DIN 53151)
GG 60° = Measurement of the luster according to Gardner (ASTM - D 523)
Imp.rev. = Reverse Impact (inch.lb)

C1B Pigmented enamel 792.1 p.b.w. polyester of Example B1
431.8 p.b.w. blocked isocyanate adduct of Example A1b
676.1 p.b.w. white pigment (TiO$_2$)
100.0 p.b.w. leveler—Masterbatch (10% Acrylate) in polyester of Example B1 (Silicone oil—Manufacturer:-Bayer AG)

The pulverized products polyester, blocked isocyanate, and leveler—Masterbatch are mixed with the white pigment in a mill and then homogenized in an extruder at 100°–130° C. After cooling the extrudate is broken up and ground by a mill to a particle size of <100μ. The powder produced in this manner is applied with an electrostatic powder sprayer to a degreased iron plate at 60 kV and cured in a forced air drying oven at temperatures between 160° and 200° C.

| Curing Conditions | Mechanical Properties | | | | | | |
|---|---|---|---|---|---|---|---|
| Time/Temp. | SD | HK | HB | ET | GS | Imp. rev. | GG 60° |
| 12'200° C. | 40–60 | 180 | 111 | 6.6–8.8 | 0 | 70 | 95 |
| 15'190° C. | 40–60 | 184 | 125 | 6.4–8.1 | 0 | 60 | >100 |
| 15'180° C. | 40–65 | 179 | 100 | 5.0–6.5 | 0 | 70 | 96 |
| 20'180° C. | 45–75 | 186 | 111 | 6.7–7.8 | 0 | 60 | >100 |
| 25'180° C. | 50–70 | 188 | 111 | 7.3–8.5 | 0 | 80 | 97 |
| 25'170° C. | 35–55 | 182 | 100 | 5.2–6.4 | 0 | 40 | 98 |
| 30'170° C. | 45–65 | 181 | 111 | 6.6–8.20 | 0 | 60 | >100 |

EXAMPLE 2

C2A CLEAR ENAMEL

The polyester of Example B2 was reacted with the blocked isocyanate adduct of Example A3b in equivalent amount and the preparation was conducted as described in Example C1a.

100.00 p.b.w. polyester of Example B2
26.78 p.b.w. blocked isocyanate of Example A3b
0.63 p.b.w. acrylate leveler The clear enamel was applied as in Example C1a and cured in a temperature range between 160° and 200° C.

| Curing Conditions | Mechanical Properties | | | | | |
|---|---|---|---|---|---|---|
| Time/Temp. | SD | HK | HB | ET | GS | Imp.rev. |
| 10'200° C. | 30–55 | 193 | 125 | >10 | 0 | >82 |
| 12'180° C. | 40–65 | 194 | 111 | >10 | 0 | >82 |
| 18'180° C. | 45–60 | 190 | 125 | >10 | 0 | >82 |
| 25'170° C. | 35–65 | 195 | 111 | >10 | 0 | >82 |

-continued

| Curing Conditions Time/Temp. | SD | HK | HB | ET | GS | Imp.rev. |
|---|---|---|---|---|---|---|
| 30'/160° C. | 40-60 | 197 | 111 | >10 | 0 | >82 |

C2B PIGMENTED ENAMEL

The powdered enamel was produced, compounded, and applied according to the method described in example C1b with the following composition.

595.5 p.b.w. polyester of Example B2
174.5 p.b.w. blocked isocyanate of Example A3b
560.0 p.b.w. white pigment (TiO$_2$)
70.0 p.b.w. leveler—Masterbatch (10% Acrylate) in polyester of Example B2

The pigmented powder enamel was cured as in Example C1b between 160° and 200° C.

| Curing Conditions Time/Temp. | SD | HK | HB | ET | GS | Imp. rev | GG 60° |
|---|---|---|---|---|---|---|---|
| 10'/200° C. | 40-60 | 180 | 100 | 9.6-10.8 | 0 | >82 | 92 |
| 15'/180° C. | 55-70 | 190 | 100 | 9.0-9.6 | 0 | 60 | 94 |
| 20'/180° C. | 60-70 | 191 | 111 | 10.2-10.8 | 0 | >82 | 96 |
| 25'/180° C. | 60-80 | 192 | 111 | 10.7-11.6 | 0 | >82 | 95 |
| 25'/170° C. | 65-75 | 188 | 100 | 8.6-9.9 | 0 | >82 | 94 |
| 30'/170° C. | 50-70 | 190 | 111 | 10.2-10.9 | 0 | >82 | 94 |
| 35'/160° C. | 65-80 | 187 | 100 | 7.8-9.5 | 0 | 50 | 92 |

EXAMPLE 3

C3A PIGMENTED ENAMEL 40%—PIGMENT

According to the method described in Example C1b a powdered enamel having the following composition was produced, applied and cured between 170° and 200° C.

603.4 p.b.w. polyester of Example B2
166.6 p.b.w. blocked isocyanate of Example A2b
560.0 p.b.w. white pigment (TiO$_2$)
70.0 p.b.w. leveler—Masterbatch of Example C2b

| Curing Conditions Time/Temp. | SD | HK | HB | ET | GS | Imp. rev. | GG 60° |
|---|---|---|---|---|---|---|---|
| 8'/200° C. | 60-70 | 188 | 100 | 8.7-9.1 | 0 | 50 | 92 |
| 10'/200° C. | 60-75 | 186 | 111 | 9.8-10.5 | 0 | >82 | 94 |
| 15'/180° C. | 60-80 | 189 | 100 | 8.4-9.3 | 0 | 40 | 95 |
| 20'/180° C. | 55-70 | 185 | 111 | 9.9-10.6 | 0 | >82 | 93 |
| 25'/170° C. | 50-60 | 188 | 100 | 9.1-.9.9 | 0 | >82 | 94 |
| 30'/160° C. | 55-75 | 190 | 100 | 8.4-9.2 | 0 | 60 | 96 |

C3b Pigmented enamel 45%—pigment

According to the method described in example C1b a powdered enamel having the following composition was produced, applied and cured between 160°-200° C.

547.4 p.b.w. polyester of Example B2
152.6 p.b.w. blocked isocyanate adduct of Example A3b
630.0 p.b.w. white pigment (TiO$_2$)
70.0 p.b.w. leveler—Masterbatch of Example C2b

| Curing Conditions Time/Temp. | SD | HK | HB | ET | GS | Imp. rev. | GG 60° |
|---|---|---|---|---|---|---|---|
| 10'/200° C. | 50-65 | 180 | 100 | 9.0-9.8 | 0 | >82 | 100 |
| 12'/190° C. | 60-80 | 182 | 111 | 9.2-9.5 | 0 | 70 | 100 |
| 18'/180° C. | 55-75 | 186 | 100 | 8.9-9.2 | 0 | 50 | 100 |
| 20'/180° C. | 60-80 | 184 | 111 | 9.4-10.5 | 0 | >82 | 98 |
| 30'/170° C. | 65-80 | 185 | 100 | 7.6-8.2 | 0 | 50 | 100 |

EXAMPLE 4

C4 PIGMENTED ENAMEL

According to the method described in Example C1b a powdered enamel having the following composition was produced, applied and cured between 170° and 200° C.

596.8 p.b.w. polyester of Example B1
303.2 p.b.w. blocked isocyanate adduct of Example A4b
525.0 p.b.w. white pigment (TiO$_2$)
75.0 p.b.w. leveler—Masterbatch of Example C1b

| Curing Conditions Time/Temp. | SD | HK | HB | ET | GS | Imp. rev. | GG 60° |
|---|---|---|---|---|---|---|---|
| 20'/200° C. | 60-80 | 182 | 100 | 9.2-9.8 | 0 | 70 | 96 |
| 20'/190° C. | 50-70 | 186 | 100 | 8.6-9.0 | 0 | 60 | 95 |
| 25'/180° C. | 55-75 | 184 | 100 | 5.5-6.2 | 0 | 40 | 98 |
| 30'/180° C. | 60-80 | 189 | 100 | 8.8-9.2 | 0 | 60 | 95 |
| 35'/170° C. | 55-75 | 187 | 100 | 5.8-7.6 | 0 | 50 | 94 |

EXAMPLE 5

C5 PIGMENTED ENAMEL

According to the method described in example C1b a powdered enamel having the following composition was produced, applied, and cured between 160° and 200° C.

522.4 p.b.w. polyester of Example B1
247.6 p.b.w. blocked isocyanate of Example A5b
560.0 p.b.w. white pigment (TiO$_2$)
70.0 p.b.w. leveler—Masterbatch of Example C1b

| Curing Composition Time/Temp. | SD | HK | HB | ET | GS | Imp. rev. | GG 60° |
|---|---|---|---|---|---|---|---|
| 12'/200° C. | 60-70 | 184 | 100 | 9.8-10.5 | 0 | >82 | 97 |
| 15'/180° C. | 50/70 | 186 | 100 | 9.5-9.8 | 0 | 70 | 96 |
| 20'/180° C. | 60-80 | 188 | 111 | 10-10.5 | 0 | >82 | 98 |
| 25'/180° C. | 55-75 | 187 | 111 | 10.1-11 | 0 | >82 | 100 |
| 20'/170° C. | 70-90 | 185 | 100 | 9.7-10.1 | 0 | 60 | 99 |
| 25'/170° C. | 60-70 | 186 | 111 | 10-10.9 | 0 | 80 | 97 |
| 35'/160° C. | 55-80 | 187 | 111 | 9.7-10.1 | 0 | 70 | 98 |

We claim:
1. Powdered coating compositions having good storage stability and particle size smaller than 0.25 mm, comprising the reaction product of polyesters which contain hydroxyl groups and melt between 40°-120° C., and ε-caprolactam partially blocked isophorondiisocyanate adducts, and catalysts, if necessary, and customary additives, wherein said isophoronediisocyanate adducts partially blocked with ε-caprolactam contain 0.1 to 1 mole of free NCO-groups per mole of adduct and are selected from the group consisting adduct containing urea groups and having an NCO-content of 22–35% weight;

adduct containing biuret groups and having an NCO-content of 20–35% by weight;

adduct containing carbodiimide groups and having an NCO-content of 22–35% by weight and an adduct which contains urea and urethane groups and which comprises the reaction product of isophoronediisocyanate and 1-hydroxy-3-aminomethyl-3,5,5-trimethylcyclohexane.

2. Method for producing the above mentioned powdered coating compositions according to claim 1, wherein the polyesters containing hydroxyl groups are reacted in the melt or in solvents at temperature of 0°–150° C., with an isophoronediisocyanate adduct partially blocked with ε-caprolactam which contains 0.1 to 1 mole of free NCO-groups per mole of adduct and 0.4–1.1 NCO-equivalents per OH equivalent.

3. The composition of claim 1 wherein said partially blocked adduct is an adduct which contains urea and urethane groups and which comprises the reaction product of isophorenediisocyanate and 1-hydroxy-3-aminomethyl-3,5,5-trimethylcyclohexane.

4. The composition of claim 1 wherein said adduct is one containing urea groups and having an NCO-content of 22–35% by weight.

5. The composition of claim 1 wherein said adduct is one containing biuret groups and having an NCO-content of 20–35% by weight.

6. The composition of claim 1 wherein said adduct is one containing carbodiimide groups and having an NCO-content of 22–35% by weight.

* * * * *